No. 787,173. PATENTED APR. 11, 1905.
G. H. HASTINGS.
TIRE.
APPLICATION FILED SEPT. 12, 1902.
Fig. I.
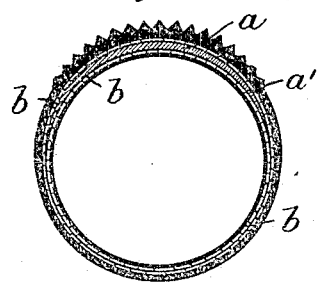
Fig. 2.
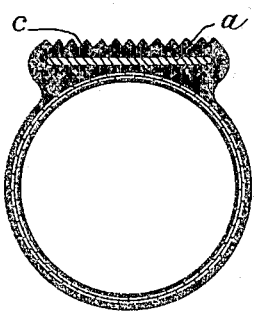
Witnesses.
Inventor.
George H. Hastings,
By Wilkinson & Fisher,
Attorneys.

No. 787,173. Patented April 11, 1905.

UNITED STATES PATENT OFFICE.

GEORGE HENRY HASTINGS, OF OPORTO, PORTUGAL.

TIRE.

SPECIFICATION forming part of Letters Patent No. 787,173, dated April 11, 1905.

Application filed September 12, 1902. Serial No. 123,184.

*To all whom it may concern:*

Be it known that I, GEORGE HENRY HASTINGS, a British subject, residing at Oporto, in the Kingdom of Portugal, have invented certain new and useful Improvements in Tires; and I do hereby declare the following to be a full, clear, and exact description of the invention, such as will enable others skilled in the art to which it appertains to make and use the same.

This invention relates to an improved puncture-proof pneumatic tire for cycles, motorcars, and other vehicles.

The invention is illustrated on the accompanying drawings, in which—

Figure 1 represents a cross-section of the improved tire in the form of a single-tube tire. Fig. 2 represents a like view of a modification.

In carrying the invention into effect I locate by cementing with any suitable adhesive a band *a* of whalebone between the layers of the fabric *b* of the tire, Fig. 1, such whalebone band being of any suitable width and thickness and preferably formed with widely-beveled or feather edges *a'*. Said whalebone band *a* is preferably kept flat, as shown in Fig. 2, and may be inserted within the substance of the rubber of a tire formed with a flat tread *c* or in any other suitable manner. Said whalebone band may be adapted to detachable or single-tube tires.

I claim—

1. The combination of a pneumatic tire having a broad flat substantially solid tread portion, of a broad flat band of whalebone intimately embedded therein and completely enveloped by said tread portion, substantially as described.

2. The combination with a pneumatic tire provided with an enlarged solid tread portion, of a flat band of whalebone intimately embedded within said solid tread portion and forming a substantial part of the interior thereof.

3. The combination with a pneumatic tire provided with an enlarged substantially solid tread portion, of a band of whalebone completely embedded within said tread portion, for protecting the tire from puncture and increasing the resiliency of the tread, whereby the tire is not deadened by the insertion of the puncture-proof material in the rubber composition.

4. The combination of a pneumatic tire, provided with a broad flat substantially solid tread portion, having a roughened surface, and a broad flat band of whalebone embedded within said solid tread portion, substantially as described.

In testimony whereof I have signed my name to this specification in the presence of two subscribing witnesses.

GEORGE HENRY HASTINGS.

Witnesses:
W. H. STURM,
ANTO FRANCISCO OHND.